March 18, 1958   R. K. LADISCH   2,827,364
PROCESS FOR DETECTING INSECT CONTAMINATION
OF FOODSTUFFS BY FLUORESCENCE
Filed Dec. 14, 1954

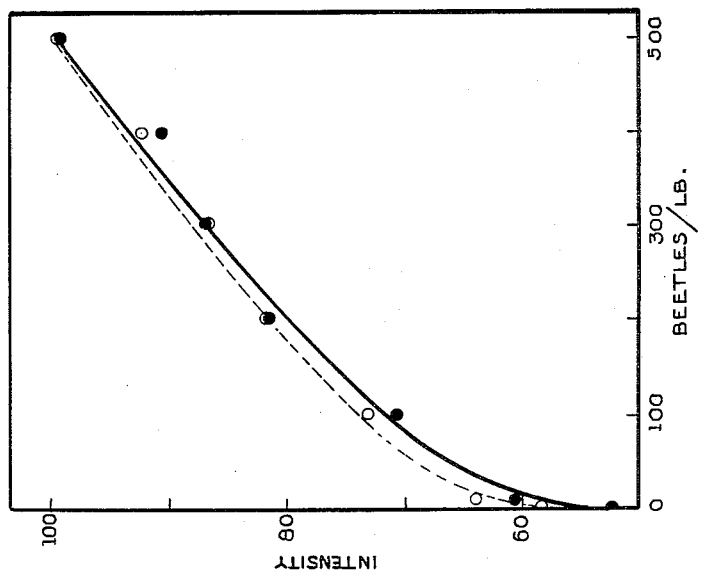

FIG. 2.— FLUORESCENCE INTENSITIES OF AMONIACAL ETHANOL EXTRACTS OF WHEAT FLOUR CONTAMINATED WITH INSECTS TRIBOLIUM CONFUSUM DUV.

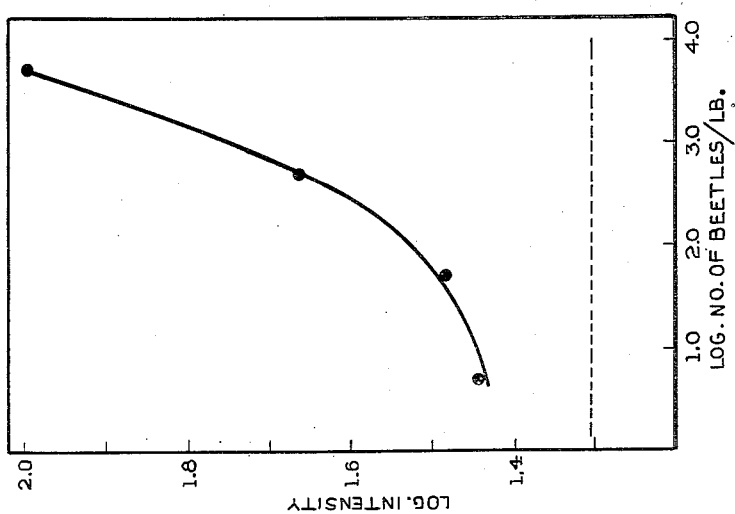

FIG. 1.— FLUORESCENCE INTENSITIES OF AMONIACAL ETHANOL EXTRACTS OF WHEAT FLOUR CONTAMINATED WITH INSECTS TRIBOLIUM CONFUSUM DUV. DOTTED LINE: FLUORESCENCE INTENSITY OF INSECT-FREE CONTROL SAMPLE.

INVENTOR
R. K. Ladisch
BY W. J. Eccleston
ATTORNEY

United States Patent Office 2,827,364
Patented Mar. 18, 1958

2,827,364

PROCESS FOR DETECTING INSECT CONTAMINATION OF FOODSTUFFS BY FLUORESCENCE

Rolf Karl Ladisch, Lansdowne, Pa.

Application December 14, 1954, Serial No. 475,322

3 Claims. (Cl. 23—230)

(Granted under Title 35, U. S. Code (1952), sec. 266)

The invention described herein, if patented, may be manufactured and used by or for the Government for governmental purposes without the payment of any royalty thereon.

This invention relates to the detection of insect contamination in wheat flour and like foodstuffs by fluorescence.

Insect infestation of grain and grain products has long been a serious problem because of economic losses. Within the past few years, attention has been focused on this subject because of insistent demands for food sanitation. See Gray, H. E., "Food in Canada," 10, 11 (1950); Herford, V. G., Roy. San. Inst. (London), 73, 412 (1953); Kay, H. D., ibid., 73, 405 (1953); Makin, A., ibid. 73, 408 (1953); Hearings, Comm. Agr. Forestry, U. S. Senate, 83rd Congress 1st Sess., "Grain-Sanitation Program of the Food and Drum Administration," Government Printing Office, 1953.

A number of researches in this field have resulted in such patents as Frankenfeld, 2,525,789, dated October 17, 1950, and Larkin, 2,639,617, dated May 26, 1953, both involving staining procedures; while Johnson, R. K. (Food Engin., 1952, p. 75) has suggested visual examination of grain by X-rays, and Potter, G. C. (Cereal Chem., 29, 223—1952) has described a spectro-photometrical method. Other workers have found that some of these cereal pests carry volatile secretions which belong to a certain class of quinones. See Alexander, P. and Barton, D. H. R., Biochem. J., 37, 463 (1943); Hackman, R. H. et al., ibid. 43, 474 (1948); Laconti, J. D. and Roth, L. M., Ann. Ent. Soc. Am., 46, 281 (1953).

I have discovered that these quinones enter into chemical reactions with flour proteins and that some of the quinonoid conjugates thus formed are fluorescent in ultraviolet light at very low concentrations. A method of detecting insect infestation by fluorescence, in accordance with my invention, seems to be exceptionally well suited for the analysis of foodstuffs, since it is sensitive enough to cover the relatively small amounts of contamination generally involved and besides is inexpensive and may be quickly made by laboratory technicians of little experience. These are among the advantages of the invention.

In the accompanying drawings, Figs. 1 and 2 are graphs showing fluorescence intensities for extracts from samples of insect-contaminated wheat flour.

The invention is best explained in connection with a description of actual procedures at the Quartermaster Pioneering Research Laboratories, Philadelphia Quartermaster Depot, U. S. Army.

Insect-free, unbleached, hard, red, spring wheat flour, specially prepared by a well-known mill in Minneapolis, Minn., was subjected to controlled contamination by flour beetles *Tribolium confusum* Duv. Two methods were employed. In method A, 5,000, 500, 50, 5 and 0 insects, respectively, were cultured by the method described by Ladisch, R. K. and McQue, B. in "Science", 118, 324 (1953), in one pound of the flour in each case, at 32° C. and 75 percent R. H. Duplicate cultures were maintained in this manner for two weeks. One set of the samples (5) were then passed through a sieve fine enough to retain the larvae and beetles. The other set of samples, still containing the insects, were ground separately through a hammer mill, powdered "Dry Ice" being added during this operation to minimize volatilization of the insect quinones. After the carbon dioxide had evaporated, jars containing the separate samples were sealed and kept in a compartment at 32° C. for another week to insure completion of the reaction between the flour and the insect quinones. All the jars were then placed in a freezing compartment at −10° C. for three days to devitalize any eggs or larvae that may have survived. Thereafter, all jars were kept tightly sealed at room temperature until used.

Method B was much the same except that 10 one pound flour samples were treated with 500, 400, 300, 200, 100, 80, 50, 30, 10 and 0 beetles, respectively, prior to sieving or grinding. No "Dry Ice" was used in the grinding operation. All ten samples of method B were kept in tightly sealed jars at room temperature until used some weeks later.

For the fluorometric study, 4 gm. samples were taken from each jar, weighed accurately to ±5 mg. Each sample was extracted with 25.0 ml. of a solvent consisting of 9 parts by volume of absolute alcohol and 1 part of 15 N ammonium hydroxide. These mixtures were each shaken for five minutes and centrifuged at high speed in a water-cooled centrifuge. The supernatant clear liquid was used directly for measuring the fluorescence in the samples of flour having 0 to 500 insects per pound, but was further diluted with 2.5 parts of the solvent when analyzing the more highly contaminated flour containing 5000 insects per pound. All glass equipment was employed throughout these operations to prevent contamination of the samples with fluorescing material, e. g., rubber.

Fluorescence spectra were obtained with an automatic recording spectrophotometer with a fluorescence attachment. Measurements of the intensity of fluorescence were also made with a well-known colorimeter with fluorescence accessories, including a sensitive triple beam galvanometer. With each of these instruments, filters were employed to isolate the excitation radiation of 365 m$\mu$. Secondary filters were used when necessary to exclude scattered ultraviolet radiation from the photocells. The colorimeter was adjusted to read 100 for the extract from the most highly contaminated sample in any series of measurements, the intensity of fluorescence of subsequent samples being referred to this basis. The measurements were made about three minutes after introducing the sample holder to allow the photocell to come to equilibrium. With the spectrophotometer, glass stoppered sample holders were used. The most highly contaminated sample of any series in this case was set at a value of 50 on the transmission dial; the data were later calculated to a basis of 100. Solvent as used for the extraction was set at zero fluorescence by means of the dark current control. These settings were frequently checked with fresh portions of solvent and standards as stated. All manipulations were carried out rapidly to minimize errors arising from evaporation of the solvent. The fluorescence was blue-green, the wave length of the emitted radiation being 455±5 millimicrons.

Referring to Fig. 1, here are shown fluorometric data for wheat flour extracts prepared as described above from samples contaminated by flour beetles *Tribolium confusum* Duv. As explained above, the test samples respectively contained varying quantities of insects (between 5 and 5000 insects) ground into each pound of flour. Because of this wide range of numerical values, the data were plotted for convenience in a log-log coordinate system. It will be observed that not only is there a consistent relationship between degrees of contamination up to 5000 beetles per pound and fluorescence intensity, but the presence of even 5 beetles ground into one pound of flour is clearly discernible. Compare the reading for the insect-free control sample, shown by the dotted line.

Fig. 2 shows fluorescence intensities of extracts of contaminated wheat flour prepared as described in the foregoing, with 10 to 500 beetles ground into each pound of flour. The small open circles show the readings using the colorimeter with fluorescence accessories, while the small closed circles record the readings when using the spectrophotometer with fluorescence accessory set. These data were quite reproducible.

A particularly interesting inherent characteristic of the present method is the fact that it reveals insect contamination of flour after most of the physical evidence of such infestation (i. e., the beetles, larvae and large fragments) had been removed. The pertinent data of samples, contaminated as described in the range of 10–500 insects per pound of flour and then "purified" by sieving, are arranged in the table following.

*Table*

Fluorescence intensities of ammoniacal ethanol extracts of flour contaminated with insects *Tribolium confusum* Duv. Flour samples were freed of beetles, larvae, and large fragments prior to analysis. Instruments used: (a) Colorimeter; (b) Spectrophotometer. Standard setting at 100.0.

| No. of beetles per pound of flour | 500 | 400 | 300 | 200 | 100 | 80 | 50 | 30 | 10 | 0 |
|---|---|---|---|---|---|---|---|---|---|---|
| (a) | 100.0 | 98.0 | 93.1 | 82.2 | 68.6 | 70.0 | 65.1 | 69.8 | 63.2 | 57.0 |
| (b) | 100.0 | | 91.0 | 81.0 | 68.4 | 68.0 | 65.8 | | 75.4 | 52.2 |

The results obtained with insect-free but previously contaminated flour samples in the lower range of contamination (0–100 beetles) are inconsistent, probably due to the mode of preparation of these samples. Workers at the Quartermaster Pioneering Research Laboratories have demonstrated by polarographic analysis with groups of 50 insects how much the amount of quinones found in the beetles depends on their age and the mode of handling, such as sieving. Other uncontrollable biological factors also cause considerable deviations in this respect (Roth, L. M., Ann. Ent. Soc. Am., 36, 397—1943), which will become more significant as the number of insects decreases. The degree of dilution of the test samples is another important factor. It was noticed that undiluted flour samples showed a greater fluorescence intensity with 500 beetles than with 5000 beetles, which may be due to a self-quenching effect, as is known to occur with other fluorescing substances at high concentrations.

Recently, I have found that a cysteine-insect quinone conjugate in slightly ammoniacal water can be determined with a concentration of the substance as low as 0.1 microgram/ml. of the substance. This corresponds to approximately 0.05 microgram of quinone ($5/100$ of 1 millionth gram). The pertinent curve was obtained with a Carey Model XL automatic spectrophotometer. Conjugates of the insect quinone with amino acids, such as cysteine, are undoubtedly formed in the interaction between the flour and the beetle secretion.

What I claim is:

1. A process of detecting contamination of wheat flour and like protein-containing foodstuffs by insects of the type that discharge volatile secretions which belong to the class of quinones, which consists in extracting a sample of the contaminated foodstuff with a solvent for fluorescent quinonoid materials in the sample, measuring the fluorescence in the supernatant clear liquid obtained from said extraction, and recording the value.

2. A process of detecting contamination of wheat flour and like protein-containing foodstuffs by insects of the type that discharge volatile secretions which belong to the class of quinones, which consists in passing a sample of the contaminated foodstuff through a sieve fine enough to retain insects and larvae contaminating the sample, extracting at least part of the sieved sample with a solvent consisting of nine parts by volume of absolute alcohol and one part by volume of 15 N ammonium hydroxide, shaking and the centrifuging the mixture, thus obtaining a clear liquid, measuring the fluorescence in the clear liquid, and recording the value.

3. A process of detecting contamination of wheat flour and like protein-containing foodstuffs by insects of the type that discharge volatile secretions which belong to the class of quinones, which consists in grinding a sample of the contaminated foodstuff, extracting at least part of the ground sample with a solvent for fluorescent quinonoid materials in the sample, shaking the mixture, then obtaining a supernatant clear liquid, measuring the fluorescence of said clear liquid, and recording the value.

References Cited in the file of this patent

Alexander and Barton: Biochemical Jo. vol. 37 (1943), pages 463–465.

UNITED STATES PATENT OFFICE

CERTIFICATE OF CORRECTION

Patent No. 2,827,364     Rolf Karl Ladisch     March 18, 1958

It is hereby certified that error appears in the above numbered patent requiring correction and that the said Letters Patent should read as corrected below.

In the grant, lines 1, 2 and 3, for "Rolf Karl Ladisch, of Lansdowne, Pennsylvania," read -- Rolf Karl Ladisch, of Lansdowne, Pennsylvania, assignor to the United States of America as represented by the Secretary of the Army, --; line 12, for "Rolf Karl Ladisch, his heirs or assigns" read -- United States of America as represented by the Secretary of the Army --; line 15, beginning with "Provided, however, that the said" strike out all to and including "thereon." in line 18; in the heading to the printed specification, line 4, for "Rolf Karl Ladisch, Lansdowne, Pa." read -- Rolf Karl Ladisch, Lansdowne, Pa., assignor to the United States of America as represented by the Secretary of the Army --; column 1, line 31, for "Drum" read -- Drug --; column 4, line 37, "the", first occurrence, read -- then --.

Signed and sealed this 24th day of June 1958.

(SEAL)
Attest:
KARL H. AXLINE
Attesting Officer

ROBERT C. WATSON
Commissioner of Patents